(12) United States Patent
Sasaki et al.

(10) Patent No.: US 9,062,769 B2
(45) Date of Patent: Jun. 23, 2015

(54) PISTON RING AND PISTON DEVICE

(75) Inventors: Hayato Sasaki, Saitama (JP); Takashi Ono, Saitama (JP)

(73) Assignee: KABUSHIKI KAISHA RIKEN, Tokyo (JP)

( * ) Notice: Subject to any disclaimer, the term of this patent is extended or adjusted under 35 U.S.C. 154(b) by 316 days.

(21) Appl. No.: 13/514,509

(22) PCT Filed: Dec. 7, 2010

(86) PCT No.: PCT/JP2010/071931
§ 371 (c)(1),
(2), (4) Date: Jun. 7, 2012

(87) PCT Pub. No.: WO2011/071049
PCT Pub. Date: Jun. 6, 2011

(65) Prior Publication Data
US 2012/0242047 A1    Sep. 27, 2012

(30) Foreign Application Priority Data
Dec. 8, 2009  (JP) ................................. 2009-278526

(51) Int. Cl.
*F16J 9/26* (2006.01)
*F16J 1/08* (2006.01)
*C10M 107/42* (2006.01)

(52) U.S. Cl.
CPC ..... *F16J 9/26* (2013.01); *F16J 1/08* (2013.01); *C10M 107/42* (2013.01); *C10M 2201/041* (2013.01); *C10M 2201/062* (2013.01); *C10M 2201/061* (2013.01)

(58) Field of Classification Search
USPC .................................................. 508/100, 107
See application file for complete search history.

(56) References Cited

U.S. PATENT DOCUMENTS 7,176,166 B2    2/2007   Maeda

FOREIGN PATENT DOCUMENTS

| EP | 1 783 349 A1 | 5/2007 |
|---|---|---|
| JP | 62-233458 A | 10/1987 |
| JP | 63-170546 A | 7/1988 |
| JP | 2001-31906 A | 2/2001 |
| JP | 2001031906 A * | 2/2001 |
| JP | 2006-22666 A | 1/2006 |
| JP | 2008-128482 A | 6/2008 |
| JP | 4151379 A | 7/2008 |
| JP | 2008-248986 A | 10/2008 |
| JP | 2008248986 A * | 10/2008 |
| WO | 2007/099968 A1 | 9/2007 |

OTHER PUBLICATIONS

International Search Report for PCT/JP2010/071931 dated Feb. 8, 2011.

* cited by examiner

*Primary Examiner* — James Goloboy
(74) *Attorney, Agent, or Firm* — Kenealy Vaidya LLP

(57) ABSTRACT

A piston ring which can sustain a superior effect of preventing aluminum cohesion for a long time in a high output engine is provided. At least one of the upper and lower side faces of a piston ring is coated with a polyimide film having hard particles dispersed therein. Employed as the hard particles may be alumina, zirconia, silicon carbide, silicon nitride, cubic boron nitride, or diamond. The hard particles are to be 0.01 to 5 μm in average particle diameter, and the film is 2 to 30 μm in thickness.

7 Claims, 3 Drawing Sheets

PISTON RING AND PISTON DEVICE

This application is a U.S. national phase filing under 35 U.S.C. §371 of PCT Application No. PCT/JP2010/071931, filed Dec. 7, 2010, and claims priority under 35 U.S.C. §119 to Japanese patent application no. 2009-278526, filed Dec. 8, 2009, the entireties of both of which are incorporated by reference herein.

TECHNICAL FIELD

The present invention relates to piston rings, and more particularly to a piston ring for an internal combustion engine.

BACKGROUND ART

The temperature in the vicinity of the top ring of a gasoline engine reaches a high temperature equal to or greater than 200° C. due to combustion of fuel. Under such a high-temperature in the internal combustion engine, combustion pressure causes the piston ring and the piston ring groove surface of the piston (hereinafter referred to as the "ring groove surface") to repeatedly collide with each other, while at the same time, the piston ring surface and the ring groove surface slide in the circumferential direction.

FIG. 1 shows the results of measurements of the roughness of the ring groove surface. On the ring groove surface, projections of about 1 μm in height, which have been caused by lathing using cutting tools, exist at intervals of 0.2 mm. To reduce the weight of a vehicle body, it is a typical practice to employ an aluminum alloy as the piston material; however, an aluminum-based material has a low heat resistance and a reduced hardness at above 200° C. When the ring groove surface collides with and slides relative to the piston ring under such a high temperature, fatigue failure may occur thereon for the projections on the surface to drop off, resulting a new surface of an active aluminum alloy appearing on the ring groove surface. Then, the dropped aluminum alloy pieces or the new aluminum alloy surface that has appeared within the ring groove may collide with the piston ring and thereby be brought into contact with the upper and lower faces of the piston ring, being further subjected to sliding. This leads to the "aluminum cohesion" which causes the aluminum alloy pieces to adhere to the side faces of the piston ring or the piston ring body to adhere to the new aluminum alloy surface of the piston. The aluminum cohesion continues to occur so long as the new aluminum alloy surface is produced, so that the progression of the aluminum cohesion would cause the piston ring to fixedly adhere to the piston within the ring groove, compromising the sealing performances of the piston ring. Losing one of the sealing performances or the gas sealing function would lead to the blowby phenomenon in which a high-pressure combustion gas flows out of the combustion chamber into the crankcase, resulting in a drop in engine output. Furthermore, losing the oil sealing function would lead to an increase in oil consumption. Furthermore, the aluminum cohesion would cause ring groove wear to progress and thereby degrade the sealability between the upper or lower face of the piston ring and the ring groove surface, leading to an increase in the amount of blowby.

To prevent the aluminum cohesion, a number of methods have conventionally been suggested for allowing the aluminum alloy, which is the base material of the piston, and a piston ring, particularly, the top ring not to be directly brought into contact with each other, or for alleviating the attack to the ring groove by the piston ring.

As the piston-side countermeasures, disclosed in Patent Literature 1 is a method for performing anodic oxidation treatment (or alumite treatment) on the ring groove surface and then filling in the fine holes, which have been produced by the processing, with a lubricating substance. Since the alumite treatment serves to form a hard film mainly composed of aluminum oxide on the ring groove surface, the aluminum alloy as the piston base material is prevented from dropping off and thus from adhering to the piston ring. However, the anodic oxidation treatment on the piston requires high costs and the resulting hard aluminum oxide provides bad initial running-in properties.

On the other hand, as the countermeasures on the piston ring side, for example, disclosed in Patent Literature 2 is a method for forming a film on the side face of the piston ring, the film having a solid lubricant such as molybdenum disulfide dispersed in a heat-resistant resin such as polyamide or polyimide. In the structure described in Patent Literature 2, the solid lubricant in the film is cleaved and worn to reduce the friction coefficient of the film, thereby alleviating the attack to the ring groove and preventing the aluminum cohesion. Furthermore, disclosed in Patent Literature 3 is a method for forming the surface film made of a heat-resistant resin containing copper-based powder on the side faces of the piston ring. In Patent Literature 3, it is stated that the addition of the copper-based powder can impart wear resistance to the surface film formed on the piston ring surfaces, thus allowing the heat-resistant resin to provide the lubricating function for a long time.

Furthermore, it is stated in Patent Literature 4 that a coat layer, which is mainly composed of a polyamide-imide resin and comprises a polyamide-imide resin film reforming agent and a dry film lubricant containing hard particles such as alumina, is formed on the sliding surface of a sliding member having streaks of a predetermined surface roughness, thereby reducing the friction coefficient of the sliding member while providing improved wear resistance and contact properties thereto. It is also stated that from the viewpoint of balance between the wear resistance and the wear of a counterpart member, alumina or silicon nitride that has a predetermined hardness is preferably employed as the hard particles.

Recently, an increasingly high temperature is reached in the vicinity of the top ring as the engine provides higher output power. Under this situation, fatigue failure tends to more easily occur due to degradation in piston strength, making it more difficult to maintain the resin film coated on the piston ring for a long time. In Patent Literature 2, the solid lubricant is added as an indispensable component; however, as described above, the solid lubricant itself is cleaved and worn to reduce the friction coefficient of the film, thus alleviating the attack to the ring groove. For this reason, the film has a low wear resistance, so that it is difficult to maintain the film for a long time so as to sustain the effect of preventing the aluminum cohesion. Furthermore, retarding the wear of such a film would restrict the amount of added solid lubricant as well as the reduction of the friction coefficient of the film. Thus, there is a possibility that the surface of the piston material having been reduced in hardness under high temperatures will be roughened, further causing the occurrence of aluminum cohesion.

Furthermore, even the films disclosed in Patent Literatures 3 and 4 cannot sufficiently reduce the attack to the counterpart member, so that there will be a possibility that under high temperatures, the surface of the counterpart member is roughened and the film itself disappears due to wear or thermal decomposition.

As can be seen from above, there has been no piston ring available which can maintain the effect of highly preventing aluminum cohesion for a long time in a high output engine.

PRIOR ART LITERATURE

Patent Literature

Patent Literature 1: Japanese Patent Application Laid-Open No. Sho. 63-170546
Patent Literature 2: Japanese Patent Application Laid-Open No. Sho. 62-233458
Patent Literature 3: WO2007/099968
Patent Literature 4: Publication of Japanese Patent No. 4151379

SUMMARY OF THE INVENTION

Problems to be Solved by the Invention

It is therefore an object of the present invention to address the problems described above and provide a piston ring which can sustain a superior effect of preventing the aluminum cohesion for a long time in a high output engine.

Means for Solving the Problems

As a result of intensive studies conducted in view of the aforementioned problems, the present inventors have found that coating at least one of the upper and lower side faces of a piston ring with a polyimide film containing hard particles makes it possible to sustain a superior effect of preventing the aluminum cohesion for a long time even in a high output engine. This finding has led to the present invention. That is, the piston ring of the present invention is characterized in that at least one of the upper and lower side faces is coated with a polyimide film containing hard particles.

Advantageous Effects of the Invention

The film of the present invention with hard particles dispersed in polyimide has a low friction coefficient and a high hardness. It is thus possible to smooth in a short time the surface of an aluminum alloy piston serving as a counterpart member without roughening the same and effectively prevent the occurrence of aluminum cohesion. Furthermore, the film of the present invention is formed of the matrix resin (base) of polyimide, which has a superior heat resistance, with hard particles added thereto to thereby provide improved wear resistance. Furthermore, the counterpart member is smoothed at the initial stage of sliding to significantly reduce friction force, thereby retarding wear and thermal decomposition under high temperatures so as to maintain the film for a long time. Furthermore, the film of the present invention makes use of the lubrication property of polyimide or the matrix resin without requiring the addition of a solid lubricant, thus never causing the wear of the film due to the cleavage of the solid lubricant. Accordingly, the piston ring of the present invention can maintain the film for a long time even in a high output engine and sustain the superior effect of preventing the aluminum cohesion.

MODE FOR CARRYING OUT THE INVENTION

Figure 1:
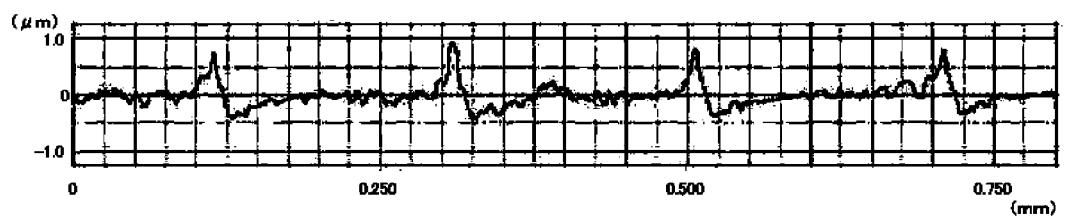
FIG. 1 is a graph showing the results of measurements of the surface roughness on the piston ring groove surface of a piston.

Now, the piston ring of the present invention will be explained in more detail.
(1) Piston Ring Base Material
The base material of the piston ring of the present invention is not limited to a particular one. However, the base material desirably has a given strength because the material will repeatedly collide with the ring groove. Employed as the preferable material may be steel, martensitic stainless steel, austenitic stainless steel, and semisteel.
(2) Piston Ring Base processing
To improve the adhesive property of the film of the present invention to the piston ring base material, the surface of the piston ring base material may be coated with a phosphate film. The phosphate film may include a zinc phosphate-based, manganese phosphate-based, or calcium phosphate-based film. Other chemical conversion films or oxide films than the phosphate films can also be formed. Since those piston rings which have hard chrome-plated film or electroless nickel-plated film formed on the surface of the base material cannot be provided with a chemical conversion film, inorganic dirt or organic dirt is desirably removed in order to ensure the adhesive property of the film. Furthermore, the surface may be blasted to adjust the roughness thereof at the same time.
(3) Film
The film of the present invention which is coated on the piston ring contains polyimide or a heat resistant resin and hard particles. Hard particles are dispersed in the polyimide having a superior lubricating property, thereby providing a film of a low friction coefficient and a high hardness. Forming such a film on the piston ring makes it possible to smooth a counterpart member or the ring groove surface of the aluminum alloy piston in a short time without roughening the same, thereby effectively retarding the occurrence of aluminum cohesion. Furthermore, the film of the present invention has a superior wear resistance because of hard particles dispersed therein as well as a superior film heat resistance because polyimide having a superior heat resistance is used as the matrix resin. Furthermore, the surface of the piston material is smoothed at the initial stage of sliding and significantly reduced in friction force, thereby retarding wear and thermal decomposition under high temperatures so as to maintain the film for a long time. Thus, the piston ring of the present invention can maintain the film for a long time even in a high output engine and sustain the superior effect of preventing the aluminum cohesion.

Conventional films for preventing aluminum cohesion have been supposed to indispensably contain or desirably contain a solid lubricant such as polytetrafluoroethylene (PTFE), molybdenum disulfide, or graphite. However, in the present invention, the solid lubricant is preferably not added, but if any, one percent or preferably up to 0.8% of solid lubricant to the entire volume of the film should be added. With the solid lubricant added, the solid lubricant itself will be cleaved and worn to thereby reduce the friction coefficient of the film and alleviate the attack to the ring groove, so that the film continues to wear causing the stripped off solid lubricant pieces to roughen the surface of the counterpart member. It is thus difficult to maintain the film for a long time under high temperatures and sustain a superior effect of preventing the aluminum cohesion.

The effects of the present invention can be obtained by forming the film of the present invention on at least one of the upper and lower side faces of the piston ring. In particular, coating the lower side face can make use of the superior effect of preventing the aluminum cohesion. Coating the upper and lower side faces of the piston ring will provide further superior effects.

The polyimide employed for the present invention preferably has a superior solubility, though not particularly limited thereto, because the film is formed typically by the liquid-phase method. Examples of the polyimide may include RIKACOAT SN-20, RIKACOAT PN-20, and RIKACOAT EN-20 (products of New Japan Chemical Co., Ltd.); FC-114 Fine polyimide varnish (a product of Fine Chemical Japan Co., Ltd.); U-varnish-A and U-varnish-S (products of Ube Industries Ltd.); H801D and H850D (products of Arakawa Chemical Industries, Ltd.); and RC5057, RC5097, and RC5019 (products of Industrial Summit Technology).

The film of the present invention is formed of polyimide as the matrix resin material. However, another heat resistant resin, such as polyamide, polyamide-imide, polybenzoimidazole, or polytetrafluoroethylene may also be added to the film at a ratio of less than 50%, preferably up to 20%, more preferably up to 5% to the volume of the entire film.

Examples of the hard particle employed to be added to the film that is coated on the piston ring of the present invention may include alumina, silica, zirconia, titania, silicon carbide, boron carbide, zirconium carbide, silicon nitride, boron nitride (cubic), and diamond. Among them, preferable ones are alumina, zirconia, silicon carbide, silicon nitride, boron nitride (cubic), and diamond. To add alumina, the type thereof is not limited to a particular one, and α alumina or γ alumina may be employed. In general, α alumina is employed as the hard particle. However, γ alumina can also be used to make use of the oil adsorption thereof, thereby providing a superior effect of preventing the aluminum cohesion. One type of the hard particles added may be used alone or two or more types may be added in combination.

The average particle diameter of the hard particles may be preferably 0.01 to 5 μm, and more preferably 0.01 to 0.5 μm. The particles having an average particle diameter of less than 0.01 μm may possibly be coagulated and thus uniformly dispersed with difficulty or provide an insufficient effect of smoothing the surface of the ring groove. On the other hand, the particles having an average particle diameter of above 5 μm may possibly reduce the retention of the particles in the polyimide or allow the particles in the film to roughen the ring groove surface.

The amount of added hard particles is preferably adjusted so as to provide an optimum hardness for the film. More specifically, the hardness of the film (at room temperature) is preferably adjusted to fall within the range of ±40% of the piston hardness at 250° C. The adjustment of the film hardness within this range will further reduce the attack of both the film and the piston to the counterpart members under high temperatures. This makes it possible to maintain the piston groove surface as a smooth surface which has a superior effect of preventing the aluminum cohesion for a long time without roughening or wearing the surfaces of the film and the piston. That is, the piston device with a piston ring mounted thereon, the piston ring being coated with a film of a hardness HV within the range of ±40% of the piston hardness at 250° C., can sustain a more superior effect of preventing the aluminum cohesion. Taking the piston hardness at 250° C. as 100%, the film adjusted to have a hardness of less than 60% would tend to readily wear and possibly provide an insufficient effect of preventing aluminum cohesion. On the other hand, taking the piston hardness at 250° C. as 100%, the film adjusted to have a hardness of above 140% would possibly increase the attack to the ring groove and thus cause the ring groove to wear. Note that the film of the present invention mainly composed of polyimide is considered to have a significant difference between the hardness at room temperature and the hardness at 250° C.

Since the hardness at 250° C. of the typically used aluminum alloy piston is about HV50, the hardness HV of the film of the present invention is preferably 30 to 70. To make an adjustment to attain such a film hardness in the case where the hard particle is alumina or silicon carbide, the hard particle is added preferably by 5 to 30 mass % with respect to the entire mass of the film.

The piston ring having the film of the present invention makes full use of a superior effect in combination with the aluminum alloy piston which contains 8.5 to 30 mass % of Si. Here, the piston ring effectively makes full use of the effect of preventing aluminum cohesion even when the aluminum alloy has a hypereutectic structure.

The thickness of the film to be coated on the piston ring of the present invention is preferably 2 to 30 μm, and more preferably 4 to 20 μm. The film less than 2 μm may be worn out before the surface of the ring groove is smoothed, possibly making insufficient use of the effect of preventing aluminum cohesion. Furthermore, the film having a thickness of above 30 μm would possibly cause inconvenience when the piston ring is attached to the ring groove, and is not preferable in terms of costs.

(4) Method for Forming the Film

The method for forming the film of the present invention is not limited to a particular one, but may employ a well-known method such as spray coating, spin coating, roll coating, dip coating, or printing. The printing method is preferable because of a superior efficiency of film and an effect of preventing the occurrence of unevenness in film. On the other hand, for the sake of convenience, the spray film is preferable.

The method for preparing the coating liquid or ink is not limited to a particular one. However, it is preferable to disperse the hard particles into a commercially available polyimide varnish and then add a solvent thereto, as required, to prepare and use the same at the optimum viscosity. The viscosity of the coating liquid or ink, and the solvent or additive employed for preparation are appropriately selected depending on the coating method or the printing method. The dispersion method is not limited to a particular one, and a well-known method such as sand mill, beads mill, ball mill, or roll mill may be employed. At this time, as required, a dispersing agent may be added as appropriate. The hard particles dispersed uniformly in polyimide provide a more superior effect of smoothing the surface of the ring groove, allowing further improvements in the effect of preventing aluminum cohesion.

After the coating or printing, the resulting film is dried and hardened. Typically, the film is hardened by being held at 250 to 400° C. for one hour. Hardening at temperatures above 400° C. would unpreferably cause the polyimide to be decomposed by oxidation.

EXAMPLES

Hereinafter, the present invention will be more specifically described in accordance with examples, but the present invention is not limited to those examples. Note that as used in the examples below, "%" represents "mass %" unless otherwise specified.

Example 1

The outer peripheral face of the piston ring made of low-chrome steel was provided with a CrN film formed by ion plating with a thickness of about 30 μm. The resulting piston ring was subjected to alkaline degreasing and then immersed for five minutes in a manganese phosphate aqueous solution which had been heated to about 80° C., thereby forming a manganese phosphate film with a thickness of about 2 μm on the surface other than the outer peripheral face of the piston ring.

The polyimide (PI) varnish (RIKACOAT SN-20, a product of New Japan Chemical Co., Ltd.), to which alumina ($Al_2O_3$) powder with an average particle diameter of 0.5 μm (the particle diameter at a 50% cumulative height point) had been added, was sufficiently stirred by an agitator and then put through a three-roll mill with the roll separations minimized, thereby preparing the coating liquid. Here, the amount of added alumina powder was adjusted to be 10% of the mass of the entire film. The upper and lower side faces of the piston ring with the manganese phosphate film formed thereon was spray coated with the coating liquid and then dried at 100° C. for ten minutes and then further heated at 280° C. for one hour in an electric furnace. The resulting film had a thickness (on one side) of about 10 μm and a film hardness HV of 39.

To measure the film hardness, the indentation hardness (Hit) was measured with a load of 4.9 mN using an ultra-micro hardness meter (DUH-211, a product of Shimadzu Corporation), and then the resulting value was converted into a Vickers hardness HV on the basis of a conversion formula HV=0.0924 Hit. Note that to find the indentation hardness (Hit) employed, ten points were measured and the resulting measurements were averaged.

Example 2

A film was formed on the upper and lower side faces of the piston ring in the same manner as in Example 1 except that as the hard particle, silicon carbide (SiC) powder with an average particle diameter of 0.5 μm was employed instead of the alumina powder. The resulting film had a thickness (on one side) of about 10 μm and a film hardness HV of 41.

Examples 3 to 9

Films were each formed on the upper and lower side faces of the piston ring in the same manner as in Example 1 except that employed as the hard particle were the alumina powders of an average particle diameter of 0.008 μm (Example 3), 0.01 μm (Example 4), 0.03 μm (Example 5), 0.05 μm (Example 6), 1 μm (Example 7), 5 μm (Example 8), and 8 μm (Example 9), respectively. The resulting films each had a thickness of about 10 μm. Furthermore, the results of hardness measurements of the respective films are shown in Table 1.

Examples 10 to 14

Films were each formed on the upper and lower side faces of the piston ring in the same manner as in Example 1 except that with the mass of the entire film defined as 100, the amounts of added alumina powder were 3 mass % (Example 10), 5 mass % (Example 11), 20 mass % (Example 12), 30 mass % (Example 13), and 40 mass % (Example 14), respectively. The resulting films each had a thickness (on one side) of about 10 μm. Furthermore, the results of hardness measurements of the respective films are shown in Table 1.

Examples 15 to 17

Films were each formed on the upper and lower side faces of the piston ring in the same manner as in Example 1 except that the amounts of applied coating liquid were adjusted for the resulting film to have a thickness (on one side) of 2 μm (Example 15), 4 μm (Example 16), and 20 μm (Example 17), respectively. The results of hardness measurements of the respective films are shown in Table 1.

Comparative Example 1

Molybdenum disulfide powder (with an average particle diameter of 2 μm) and graphite powder (with an average particle diameter of 2 μm) were added to the liquid of polyamide-imide (PAI) resin (HR16NN, a product of Toyobo Co., Ltd.) diluted with N-methyl-2-pyrrolidone. Then, the resulting liquid was sufficiently stirred by an agitator and then put through a three-roll mill with the roll separations minimized, thereby preparing the coating liquid. Here, the amounts of added molybdenum disulfide powder and the graphite powder were each 5 mass % with the mass of the entire film defined as 100. Using the resulting coating liquid, a film was formed on a piston ring identical to that of Example 1 in the same manner as in Example 1. The resulting film had a thickness (on one side) of about 10 μm and a film hardness HV of 56.

Comparative Example 2

A film was formed on the upper and lower side faces of the piston ring in the same manner as in Example 1 except that the additive was changed from the alumina powder to molybdenum disulfide powder (with an average particle diameter of 2 μm) and graphite powder (with an average particle diameter of 2 μm). The amounts of the added molybdenum disulfide powder and graphite powder were each 5 mass % with the mass of the entire film defined as 100. The resulting film had a thickness (on one side) of about 10 μm and a film hardness HV of 25.

Comparative Example 3

Alumina powder with an average particle diameter of 0.5 μm was added to the liquid of polyamide-imide resin (HR16NN, a product of Toyobo Co., Ltd.) diluted with N-methyl-2-pyrrolidone. Then, the resulting liquid was sufficiently stirred by an agitator and then put through a three-roll mill with the roll separations minimized, thereby preparing the coating liquid. Here, the amount of added alumina powder was adjusted to be 10 mass % with the mass of the entire film defined as 100. Using the resulting coating liquid, a film was formed on a piston ring identical to that of Example 1 in the same manner as in Example 1. The resulting film had a thickness (on one side) of about 10 μm and a film hardness HV of 70.

Comparative Example 4

Scaly copper powder with an average particle diameter of 10 μm (the length of the major axis of the scales) was added to the liquid of polyamide-imide resin (HR16NN, a product of Toyobo Co., Ltd.) diluted with N-methyl-2-pyrrolidone. Then, the resulting liquid was sufficiently stirred by an agitator and then put through a three-roll mill with the roll separations minimized, thereby preparing the coating liquid. Here, the amount of added copper powder was adjusted to be 20 mass % with the mass of the entire film defined as 100. Using the resulting coating liquid, a film was formed on a piston ring identical to that of Example 1 in the same manner as in Example 1. The resulting film had a thickness of about 10 μm and a film hardness HV of 60.

Comparative Example 5

A film was formed on the upper and lower side faces of the piston ring in the same manner as in Example 1 except that the additive was changed from the alumina powder to scaly copper powder with an average particle diameter of 10 μm (the length of the major axis of the scales). The amount of the added scaly copper powder was 20 mass % with the mass of the entire film defined as 100. The resulting film had a thickness of about 10 μm and a film hardness HV of 29.

(Cohesion Test)

Figure 2:
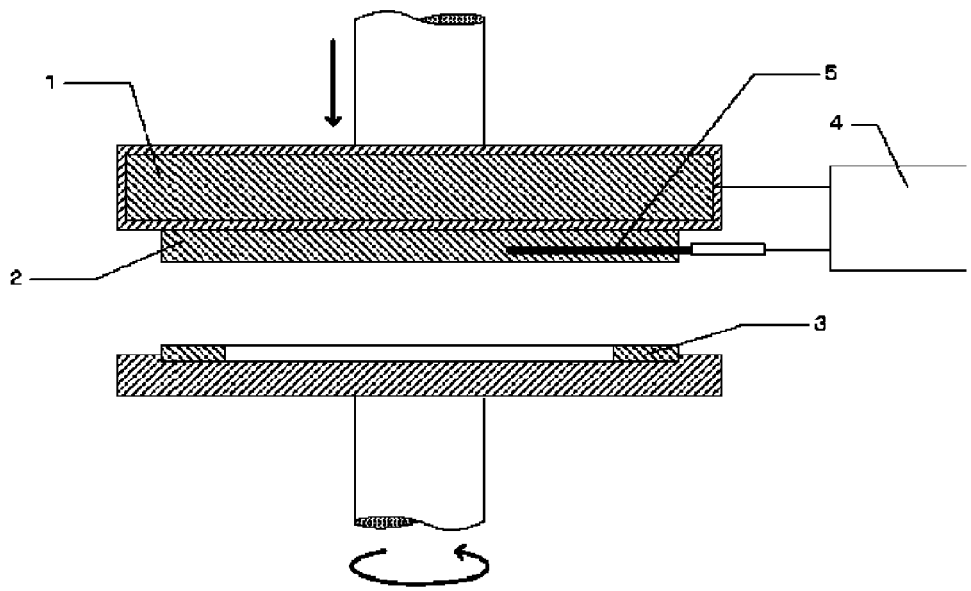
FIG. 2 is a cross-sectional view illustrating the outline of a cohesion tester.

The piston ring 3 of each of Examples 1 to 17 and Comparative Examples 1 to 5 was mounted to the cohesion tester shown in FIG. 2. A cohesion test was conducted for three hours in which while the piston ring 3 was being rotated at 3.0 mm/s, the piston material 2 of aluminum alloy was moved up and down and loaded with a surface pressure of 5 MPa at predetermined intervals. Here, using a heater 1 and a thermocouple 5, the temperature of the piston material 2 was controlled to be 250° C.±1° C., and the piston ring 3 was sprayed with a constant amount of lubricating oil at predetermined intervals together with a nitrogen gas.

Note that the piston material employed was AC8A-T6. Using the high-temperature microhardness tester QM type, a product of Nikon Corporation, the hardness of the piston material was measured while being held at 250° C.±1° C., and the resulting value was 50 HV.

Table 1 shows the results which were obtained, after the cohesion test, by evaluating the amount of residual film on and the presence of cohesion to the piston ring as well as the amount of wear and the surface roughness of the piston material. Each evaluation item was shown with the following criteria. The surface roughness of the piston material was calculated in terms of the level difference Rk of the core portion in accordance with JIS B0633. Note that the surface roughness Rk of the piston material was about 1.0 μm before the cohesion test.

Amount of residual film (piston ring): 3 μm or greater=rank AA; 1 μm or greater to less than 3 μm=rank A; less than 1 μm (manganese phosphate film remained)=rank B; and less than 1 μm (no manganese phosphate film)=rank C Presence or absence of cohesion (piston ring): not found=rank A; found but not much=rank B, and found=rank C Amount of wear (piston material): less than 0.5 μm=rank AA; 0.5 μm or greater to less than 1.0 μm=rank A; 1.0 μm or greater to less than 1.5 μm=rank B; and 1.5 μm or greater=rank C Surface roughness (piston material): less than 0.3 μm=rank AA; 0.3 μm or greater to less than 0.5 μm=rank A; 0.5 μm or greater to less than 0.7 μm=rank B; and 0.7 μm or greater=rank C Total determination: Very good=rank AA; good=rank A; Not good=rank B; Not acceptable=rank C

TABLE 1

| | | Film Material | | | | | Cohesion Test Results | | | | |
|---|---|---|---|---|---|---|---|---|---|---|---|
| | | Additive | | | | | Piston Ring | | | | |
| | | | Average Particle Diameter (μm) | Amount of Additive (mass %) | Film Hardness Hv | Thickness (μm) | Amount of Residual Film | Cohesion | Piston Material | | |
| | Resin | Type | | | | | | | Amount of Wear | Surface Roughness | Determination |
| Example 1 | PI | $Al_2O_3$ | 0.5 | 10 | 39 | 10 | AA | A | AA | AA | AA |
| Example 2 | PI | SiC | 0.5 | 10 | 41 | 10 | AA | A | AA | AA | AA |
| Example 3 | PI | $Al_2O_3$ | 0.008 | 10 | 46 | 10 | AA | A | AA | A | A |
| Example 4 | PI | $Al_2O_3$ | 0.01 | 10 | 47 | 10 | AA | A | AA | AA | AA |
| Example 5 | PI | $Al_2O_3$ | 0.03 | 10 | 45 | 10 | AA | A | AA | AA | AA |
| Example 6 | PI | $Al_2O_3$ | 0.05 | 10 | 43 | 10 | AA | A | AA | AA | AA |
| Example 7 | PI | $Al_2O_3$ | 1 | 10 | 37 | 10 | AA | A | AA | AA | AA |
| Example 8 | PI | $Al_2O_3$ | 5 | 10 | 35 | 10 | AA | A | AA | AA | AA |
| Example 9 | PI | $Al_2O_3$ | 8 | 10 | 34 | 10 | AA | A | A | A | A |
| Example 10 | PI | $Al_2O_3$ | 0.5 | 3 | 28 | 10 | A | A | AA | A | A |
| Example 11 | PI | $Al_2O_3$ | 0.5 | 5 | 31 | 10 | AA | A | AA | AA | AA |
| Example 12 | PI | $Al_2O_3$ | 0.5 | 20 | 52 | 10 | AA | A | AA | AA | AA |
| Example 13 | PI | $Al_2O_3$ | 0.5 | 30 | 68 | 10 | AA | A | AA | AA | AA |
| Example 14 | PI | $Al_2O_3$ | 0.5 | 40 | 80 | 10 | AA | A | A | A | A |
| Example 15 | PI | $Al_2O_3$ | 0.5 | 10 | 40 | 2 | B | A | A | A | A |
| Example 16 | PI | $Al_2O_3$ | 0.5 | 10 | 41 | 4 | AA | A | AA | AA | AA |
| Example 17 | PI | $Al_2O_3$ | 0.5 | 10 | 38 | 20 | AA | A | AA | AA | AA |
| Comparative Example 1 | PAI | * | * | * | 56 | 10 | C | C | C | C | C |
| Comparative Example 2 | PI | * | * | * | 25 | 10 | B | B | B | C | B |
| Comparative Example 3 | PAI | $Al_2O_3$ | 0.5 | 10 | 70 | 10 | B | B | B | A | B |
| Comparative Example 4 | PAI | Cu | 10 | 20 | 60 | 10 | B | B | B | B | B |
| Comparative Example 5 | PI | Cu | 10 | 20 | 29 | 10 | B | B | B | B | B |

* molybdenum disulfide powder (2 μm in average particle diameter): 5 mass, graphite powder (2 μm in average particle diameter): 5 mass In Comparative Example 1 which employed the formation of the film having molybdenum disulfide and graphite dispersed in polyamide-imide, it was found after the cohesion test that no polyamide-imide film remained and the underlying manganese phosphate film also reached an advanced stage of wear, with significant aluminum cohesion observed. It was also found that the surface of the piston material was not smoothed and an advanced stage of wear was reached. In Comparative Example 2 which employed the formation of the film having molybdenum disulfide and graphite dispersed in polyimide, it was found that although less aluminum cohesion had occurred than in Comparative Example 1, only a slight amount of polyimide film remained and the piston material was hardly smoothed and an advanced stage of wear was reached. In Comparative Example 3 which employed the formation of the film having alumina powder dispersed in polyamide-imide, it was found that although the effect of smoothing the piston material was improved compared with Comparative Examples 1 and 2, the piston ring film hardly remained and cohesion occurred, with wear found in the piston material.

The occurrence of aluminum cohesion was also found in Comparative Example 4 in which copper powder was dispersed in polyamide-imide and in Comparative Example 5 which employed the formation of the film having copper powder dispersed in polyimide. In both Comparative Examples 4 and 5, it was found that the piston ring film hardly remained, the piston material reached an advanced stage of wear with the surface thereof not smoothed.

On the other hand, in both the cases of Example 1 which employed the formation of the film having alumina powder dispersed in polyimide and Example 2 which employed the formation of the film having silicon carbide dispersed in polyimide, no occurrence of aluminum cohesion was observed and only a small amount of wear was found in the film and the piston material, with the surface of the piston material having been smoothed. The film having hard particles dispersed in polyimide had a low friction coefficient and a high hardness. It is thus thought that the surface of the piston material was smoothed in a short time, thereby making use of the superior effect of preventing the aluminum cohesion. Furthermore, since the smoothing occurring at the initial stage of sliding reduced the level of attack to the piston material and the level of wear of the piston material while the film itself had a superior heat resistance with no solid lubricant added thereto, it is assumed that the film was maintained even under high temperatures. Note that Examples 1 and 2 were further subjected to the cohesion test for 10 hours; however, no aluminum cohesion was observed. This is thought to be due to the fact that the smoothing of the piston material at the initial stage of sliding served to sustain the superior effect of preventing the aluminum cohesion even when additional collisions and sliding occurred under high temperatures.

In all the cases of Examples 1 and 3 to 9 with various average particle diameters of alumina particles, no occurrence of aluminum cohesion was observed and only a slight wear was found in the film. In particular, Examples 1, 4, 5, 6, 7, and 8 which employed an average alumina particle diameter within the range of 0.01 to 5 μm revealed a more superior effect of smoothing the piston material and a very small amount of wear of the piston material, i.e., less than 0.5 μm.

In all Examples 1 and 10 to 14 with various amounts of added alumina particles, no occurrence of aluminum cohesion was observed and only a slight wear was found in the film. In particular, Examples 1 and 11 to 13 in which the amount of added alumina powder falls within the range of 5 mass % to 30 mass % and the film hardness within the range of 30 to 70 revealed a more superior film wear resistance and a more superior effect of smoothing the piston material, with a very small amount of wear of the piston material, i.e., less than 0.5 μm. Here, the film hardness according to Examples 1 and 11 to 13 fell within the range of ±40% the hardness 50HV of the piston material at a test temperature of 250° C.

In all Examples 1 and 15 to 17 with various thicknesses of the film, no occurrence of aluminum cohesion was observed. In particular, Examples 1, 16, and 17 with the thickness of the film falling within the range of 4 μm to 20 μm revealed a more superior film wear resistance and a more superior effect of smoothing the piston material, with a very small amount of wear of the piston material, i.e., less than 0.5 μm. Note that in Example 15, the film thickness after the cohesion test was 0.5 to 1.0 μm.

(Engine Test)

The piston rings according to Examples 1 and 4 to 14 and Comparative Examples 2 to 5 were each mounted into the top ring groove of an aluminum alloy (AC8A-T6) piston, which was then installed in a 1.5-liter 4-cylinder engine. With this engine, an engine test was conducted at an RPM of 6000 rpm for 400 hours. After the test ended, the amount of residual film on the lower face of the piston ring and the amount of wear on the lower side of the top ring groove were measured. The second ring and the oil ring employed had the following specifications.

(1) Second Ring

Material: SWOSC-V, entirely subjected to a zinc phosphate treatment (2) Oil Ring Side Rail Material: JIS G3502 SWRS 82A-K, CrN film being formed on the outer peripheral face by ion plating Spacer Expander Material: SUS304

It was observed in the engine with the sample of Comparative Example 2 mounted that the resin film on the lower face of the piston ring and the underlying manganese phosphate film were lost with the base material exposed in 10 hours after the operation started. The engine test was continued in this condition, so that 300 hours later, the blowby value exceeded 1.3 times the value at the initial stage of the operation, and thus the operation was stopped. The aluminum cohesion was found on the piston ring after the test.

Comparative Examples 3, 4, and 5 were also subjected to the engine test in the same manner, and it was observed that the resin film on the lower face of the piston ring and the underlying manganese phosphate film were lost with the base material exposed in 100 hours, 30 hours, and 50 hours, respectively, after the operation started. Thus, the engine test was stopped at the respective points in time.

Figure 3:
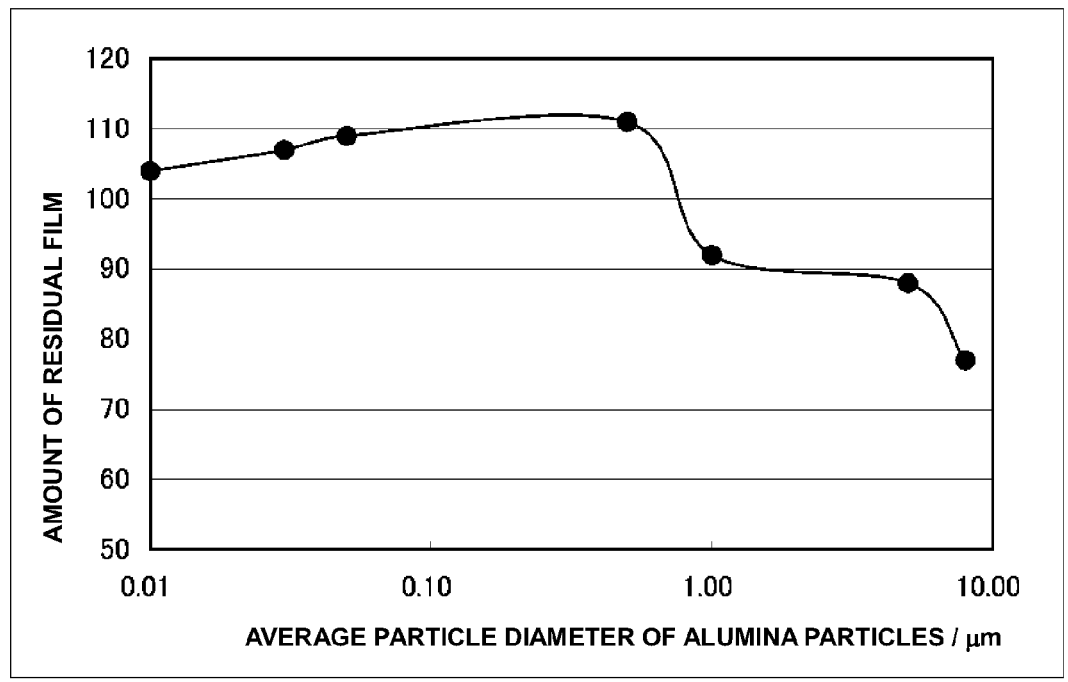
FIG. 3 is a graph showing the relationship between the average particle diameter of additives (alumina particles) and the amount of residual film on the lower face of a piston ring.
Figure 4:
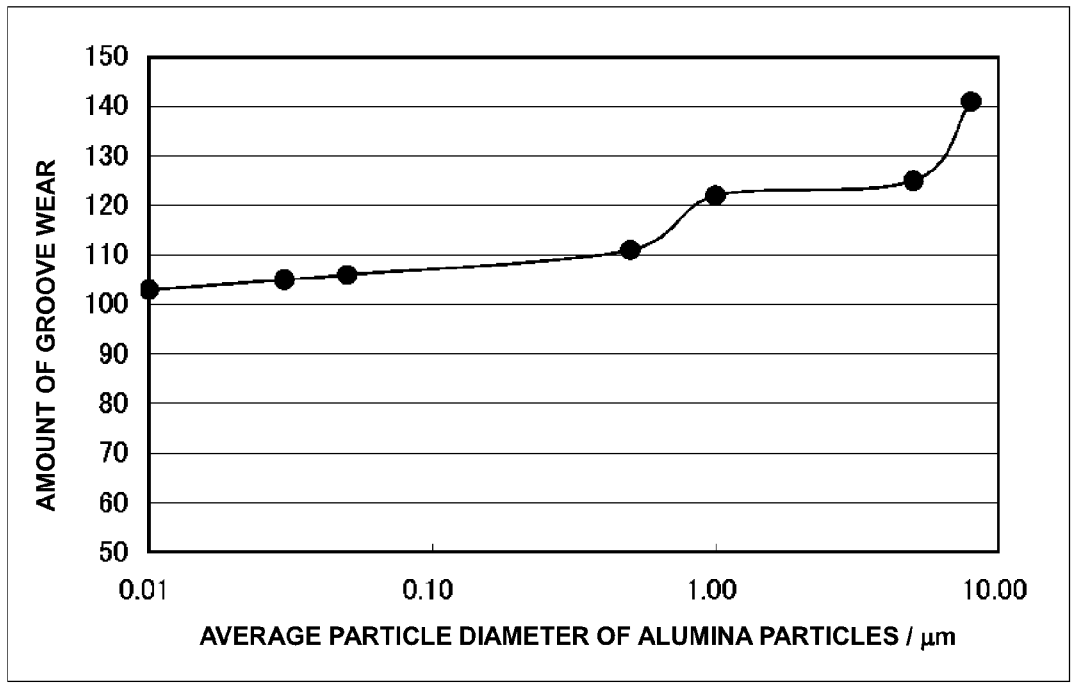
FIG. 4 is a graph showing the relationship between the average particle diameter of additives (alumina particles) and the amount of wear on the lower face of the top ring groove.

On the other hand, in all Examples 1 and 4 to 14, the amount of blowby was not changed a great deal from the start of the operation until 400 hours elapsed, so that the resin film was maintained even after the operation ended, and thus a significant difference from the Comparative Examples was observed. FIG. 3 shows the relationship between the average particle diameter of additives (alumina particles) and the amount of residual film on the lower face of the piston ring (Examples 1 and 4 to 9). Here, the vertical axis represents relative values with the amount of residual film defined as 100 for the sample of an average alumina particle diameter of 0.01 μm (Example 4). Furthermore, FIG. 4 shows the relationship between the average particle diameter of alumina particles and the amount of wear on the lower face of the top ring groove (Examples 1 and 4 to 9).

Here, the vertical axis represents relative values with the amount of groove wear defined as 100 for the sample of an average alumina particle diameter of 0.01 μm (Example 4).

It was observed from FIG. 3 that an increased amount of residual film is found within the range of an average alumina particle diameter of 0.01 μm to 5 μm and a further increased amount of residual film is observed within the range of 0.01 μm to 0.5 μm. This is thought to be because of the fact that within the range of an average alumina particle diameter of 0.01 μm to 5 μm, the amount of film wear is reduced because the alumina particles have a high retention in the polyimide, while within the range of an average alumina particle diameter of 0.01 μm to 0.5 μm, finer alumina particles are uniformly dispersed in the polyimide so as to reduce variations in the hardness of the film, thereby further reducing the amount of wear of the film. On the other hand, it was observed from FIG. 4 that a reduced amount of groove wear is found in an average alumina particle diameter of 0.01 μm to 5 μm, and a further reduced amount of groove wear is found in 0.01 μm to 0.5 μm. It is thought that within these ranges, the alumina particles in the film effectively smoothed the surface of the ring groove, and the attack to the ring groove surface was minimized.

Figure 5:
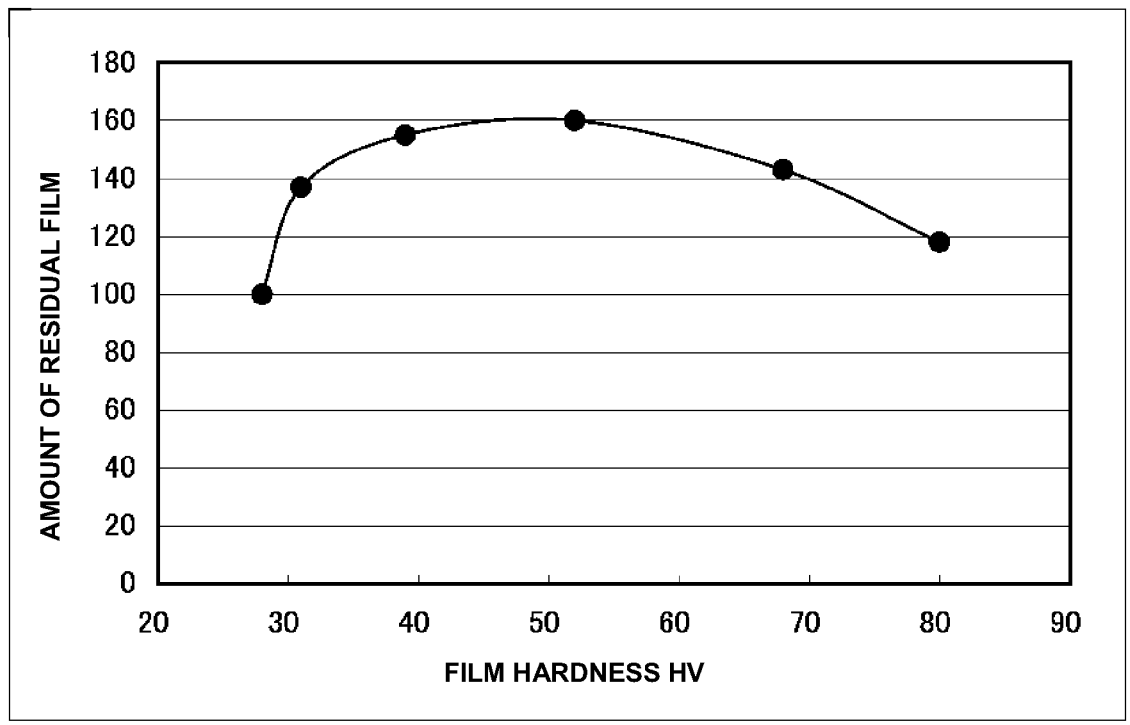
FIG. 5 is a graph showing the relationship between the hardness of piston ring film and the amount of residual film on the lower face of the piston ring.
Figure 6:
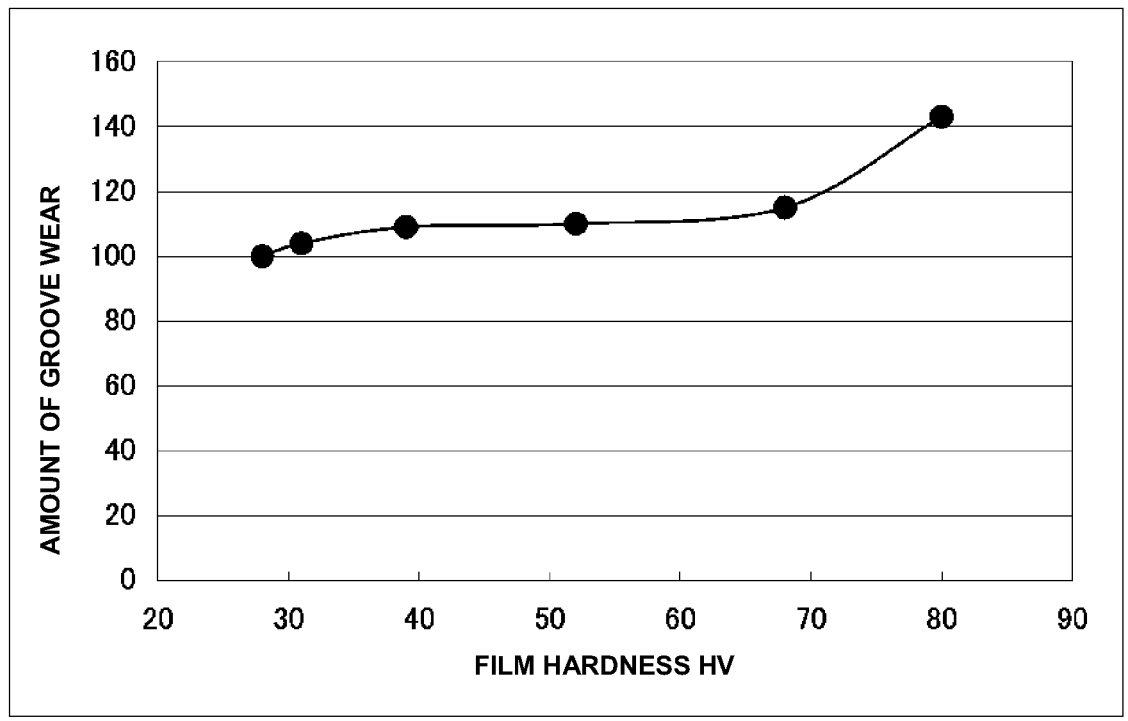
FIG. 6 is a graph showing the relationship between the hardness of piston ring film and the amount of wear on the lower face of the top ring groove.

FIG. 5 shows the relationship between the hardness of the piston ring film and the amount of residual film on the lower face of the piston ring (Examples 1 and 10 to 14). Here, the vertical axis represents relative values with the amount of residual film for a film hardness HV of 28 (−44% hardness with respect to the piston hardness at 250° C. (Example 10)) being defined as 100. Furthermore, FIG. 6 shows the relationship between the hardness of the piston ring film and the amount of wear on the lower face of the top ring groove (Examples 1 and 10 to 14). Here, the vertical axis represents relative values with the amount of wear on the lower face of the top ring groove, for the sample of a film hardness HV of −44% with respect to the piston hardness at 250° C. (Example 10), being defined as 100.

It was observed from FIG. 5 that the amount of residual film was increased in a film hardness HV of 30 (−40% with respect to the piston hardness at 250° C.) to 70 (40% with respect to the piston hardness at 250° C.). On the other hand, it was observed from FIG. 6 that the amount of groove wear was reduced in a film hardness HV of 30 (−40% with respect to the piston hardness at 250° C.) to 70 (40% with respect to the piston hardness at 250° C.). It is thought that within this hardness range, the film had a sufficient wear resistance to collisions with and sliding on the ring groove, and the attack to the ring groove was minimized.

REFERENCE SIGNS LIST

1 HEATER
2 PISTON MATERIAL
3 PISTON RING
4 TEMPERATURE CONTROLLER
5 THERMOCOUPLE

The invention claimed is:

1. A piston ring having at least one of upper and lower side faces coated with a film, wherein the film is a polyimide film containing hard particles,
   the hard particles have an average particle diameter of 0.01 to 5 μm, and
   the film has a hardness HV at 250° C. of 30 to 70 which falls within a range of ±40% of a piston hardness at 250° C.

2. The piston ring according to claim 1, wherein the hard particles are of at least one type selected from the group consisting of alumina, zirconia, silicon carbide, silicon nitride, cubic boron nitride, and diamond.

3. The piston ring according to claim 1, wherein the film has a thickness of 2 to 30 μm.

4. The piston device having the piston ring according to claim 1 mounted thereon.

5. The piston ring according to claim 2, wherein the film has a thickness of 2 to 30 μm.

6. The piston device having the piston ring according to claim 2 mounted thereon.

7. The piston device having the piston ring according to claim 3 mounted thereon.

* * * * *